US010190478B1

(12) United States Patent
Giraudo

(10) Patent No.: US 10,190,478 B1
(45) Date of Patent: Jan. 29, 2019

(54) CONTROLLING A COOLING SYSTEM FOR AN INTERNAL COMBUSTION ENGINE USING FEEDBACK LINEARIZATION

(71) Applicant: GM Global Technology Operations LLC, Detroit, MI (US)

(72) Inventor: Gabriele Giraudo, Turin (IT)

(73) Assignee: GM GLOBAL TECHNOLOGY OPERATIONS LLC, Detroit, MI (US)

( * ) Notice: Subject to any disclaimer, the term of this patent is extended or adjusted under 35 U.S.C. 154(b) by 0 days.

(21) Appl. No.: 15/659,107

(22) Filed: Jul. 25, 2017

(51) Int. Cl.
| | | |
|---|---|---|
| *F01P 7/00* | (2006.01) | |
| *F01P 7/16* | (2006.01) | |
| *F01P 3/20* | (2006.01) | |
| *G05B 13/04* | (2006.01) | |
| *G01K 13/00* | (2006.01) | |

(52) U.S. Cl.
CPC ...... *F01P 7/16* (2013.01); *F01P 3/20* (2013.01); *G01K 13/00* (2013.01); *G05B 13/041* (2013.01); *F01P 2023/00* (2013.01); *F01P 2023/08* (2013.01)

(58) Field of Classification Search
CPC .. F01P 7/16; F01P 3/20; F01P 2023/00; F01P 2023/08
See application file for complete search history.

(56) References Cited

U.S. PATENT DOCUMENTS

| | | | | |
|---|---|---|---|---|
| 4,359,029 A | * | 11/1982 | Furuhashi | F02D 41/1474 123/681 |
| 4,768,484 A | * | 9/1988 | Scarselletta | F01P 3/22 123/41.21 |
| 6,394,044 B1 | * | 5/2002 | Bedapudi | F01P 7/04 123/196 AB |
| 6,422,181 B1 | * | 7/2002 | Ovari | F01P 7/167 123/41.1 |
| 10,036,338 B2 | * | 7/2018 | Fuxman | F01P 7/026 |
| 2005/0006487 A1 | * | 1/2005 | Suda | F01P 7/167 236/46 R |
| 2011/0106398 A1 | * | 5/2011 | Ikeda | F02D 35/02 701/102 |
| 2011/0106408 A1 | * | 5/2011 | Morimoto | F02D 41/1401 701/103 |
| 2011/0139096 A1 | * | 6/2011 | Niimi | B60K 6/445 123/2 |

(Continued)

*Primary Examiner* — Thomas Moulis
(74) *Attorney, Agent, or Firm* — Cantor Colburn LLP

(57) ABSTRACT

Examples of techniques for controlling a cooling system for an internal combustion engine using feedback linearization are provided. In one example implementation, a computer-implemented method includes receiving, by a processing device, desired temperature targets. The method further includes receiving, by the processing device, temperature feedbacks. The method further includes calculating, by the processing device, a desired temperature derivative for each of the desired temperature targets. The method further includes calculating, by the processing device, desired coolant flows from the desired temperature derivative for each of the desired temperature targets using feedback linearization. The method further includes calculating, by the processing device, actuator commands from the desired coolant flows using an inverted hydraulic model. The method further includes implementing, by the processing device, the actuator commands in actuators in the cooling system.

20 Claims, 4 Drawing Sheets

(56) References Cited

U.S. PATENT DOCUMENTS

| | | | | |
|---|---|---|---|---|
| 2011/0284309 A1* | 11/2011 | Gooden | ............... | B60H 1/14 |
| | | | | 180/339 |
| 2016/0290216 A1* | 10/2016 | Katragadda | ............. | F01P 11/16 |
| 2017/0002721 A1* | 1/2017 | Naik | ..................... | F04B 49/02 |
| 2017/0030274 A1* | 2/2017 | Nakanishi | ............... | F01P 7/16 |
| 2018/0087450 A1* | 3/2018 | Karnik | .............. | B60H 1/00885 |

\* cited by examiner

CONTROLLING A COOLING SYSTEM FOR AN INTERNAL COMBUSTION ENGINE USING FEEDBACK LINEARIZATION

INTRODUCTION

The present disclosure relates generally to internal combustion engines and more particularly to controlling a cooling system for an internal combustion engine using feedback linearization.

A vehicle, such a car, a truck, a motorcycle, or any other type of automobile may be equipped with an internal combustion engine to provide a source of power for the vehicle. Power from the engine can include mechanical power (to enable the vehicle to move) and electrical power (to enable electronic systems, pumps, etc. within the vehicle to operate). As an internal combustion engine operates, the engine and its associated components generate heat, which can damage the engine and its associated components if left unmanaged.

To reduce heat in the engine, a cooling system circulates a coolant fluid through cooling passages within the engine. The coolant fluid absorbs heat from the engine and is then cooled via a heat exchanger in a radiator when the coolant fluid is pumped out of the engine and into the radiator. Accordingly, the coolant fluid becomes cooler and is then circulated back through the engine to cool the engine and its associated components.

SUMMARY

Examples of techniques for controlling a cooling system for an internal combustion engine using feedback linearization are provided. In one example embodiment, a computer-implemented method includes receiving, by a processing device, desired temperature targets. The method further includes receiving, by the processing device, temperature feedbacks. The method further includes calculating, by the processing device, a desired temperature derivative for each of the desired temperature targets. The method further includes calculating, by the processing device, desired coolant flows from the desired temperature derivative for each of the desired temperature targets using feedback linearization. The method further includes calculating, by the processing device, actuator commands from the desired coolant flows using an inverted hydraulic model. The method further includes implementing, by the processing device, the actuator commands in actuators in the cooling system.

In another example embodiment, a system for controlling a cooling system for an internal combustion engine using feedback linearization is provided. The system includes a memory comprising computer readable instructions and a processing device for executing the computer readable instructions for performing a method. The method includes receiving, by a processing device, desired temperature targets. The method further includes receiving, by the processing device, temperature feedbacks. The method further includes calculating, by the processing device, a desired temperature derivative for each of the desired temperature targets. The method further includes calculating, by the processing device, desired coolant flows from the desired temperature derivative for each of the desired temperature targets using feedback linearization. The method further includes calculating, by the processing device, actuator commands from the desired coolant flows using an inverted hydraulic model. The method further includes implementing, by the processing device, the actuator commands in actuators in the cooling system.

In another example embodiment, a computer program product for controlling a cooling system for an internal combustion engine using feedback linearization is provided. The computer program product includes a computer readable storage medium having program instructions embodied therewith, wherein the computer readable storage medium is not a transitory signal per se, the program instructions executable by a processing device to cause the processing device to perform a method. The method includes receiving, by a processing device, desired temperature targets. The method further includes receiving, by the processing device, temperature feedbacks. The method further includes calculating, by the processing device, a desired temperature derivative for each of the desired temperature targets. The method further includes calculating, by the processing device, desired coolant flows from the desired temperature derivative for each of the desired temperature targets using feedback linearization. The method further includes calculating, by the processing device, actuator commands from the desired coolant flows using an inverted hydraulic model. The method further includes implementing, by the processing device, the actuator commands in actuators in the cooling system.

According to one or more embodiments, the method further includes measuring actual temperatures. According to one or more embodiments, the method further includes determining actual temperatures using virtual sensors. According to one or more embodiments, the method further includes inputting the actual temperatures into the feedback linearization and the inverted hydraulic model. According to one or more embodiments, calculating the desired coolant flows using the feedback linearization is based at least in part on the actual temperatures. According to one or more embodiments, calculating the actuator commands using the inverted hydraulic model is based at least in part on the actual temperatures. According to one or more embodiments, calculating the actuator commands using the inverted hydraulic model is based at least in part on flow requests. According to one or more embodiments, calculating the actuator commands using the inverted hydraulic model is based at least in part on information that can force the actuator commands to perform a specific task. According to one or more embodiments, calculating the desired temperature derivative for each of the desired temperature targets is based at least in part on the actual temperatures. According to one or more embodiments, calculating the desired temperature derivative for each of the desired temperature targets is performed using a proportional-integral-derivative controller. According to one or more embodiments, the method further includes applying an anti-wind-up action.

The above features and advantages, and other features and advantages of the disclosure, are readily apparent from the following detailed description when taken in connection with the accompanying drawings.

BRIEF DESCRIPTION OF THE DRAWINGS

Other features, advantages, and details appear, by way of example only, in the following detailed description, the detailed description referring to the drawings in which.

DETAILED DESCRIPTION

Figure 1:
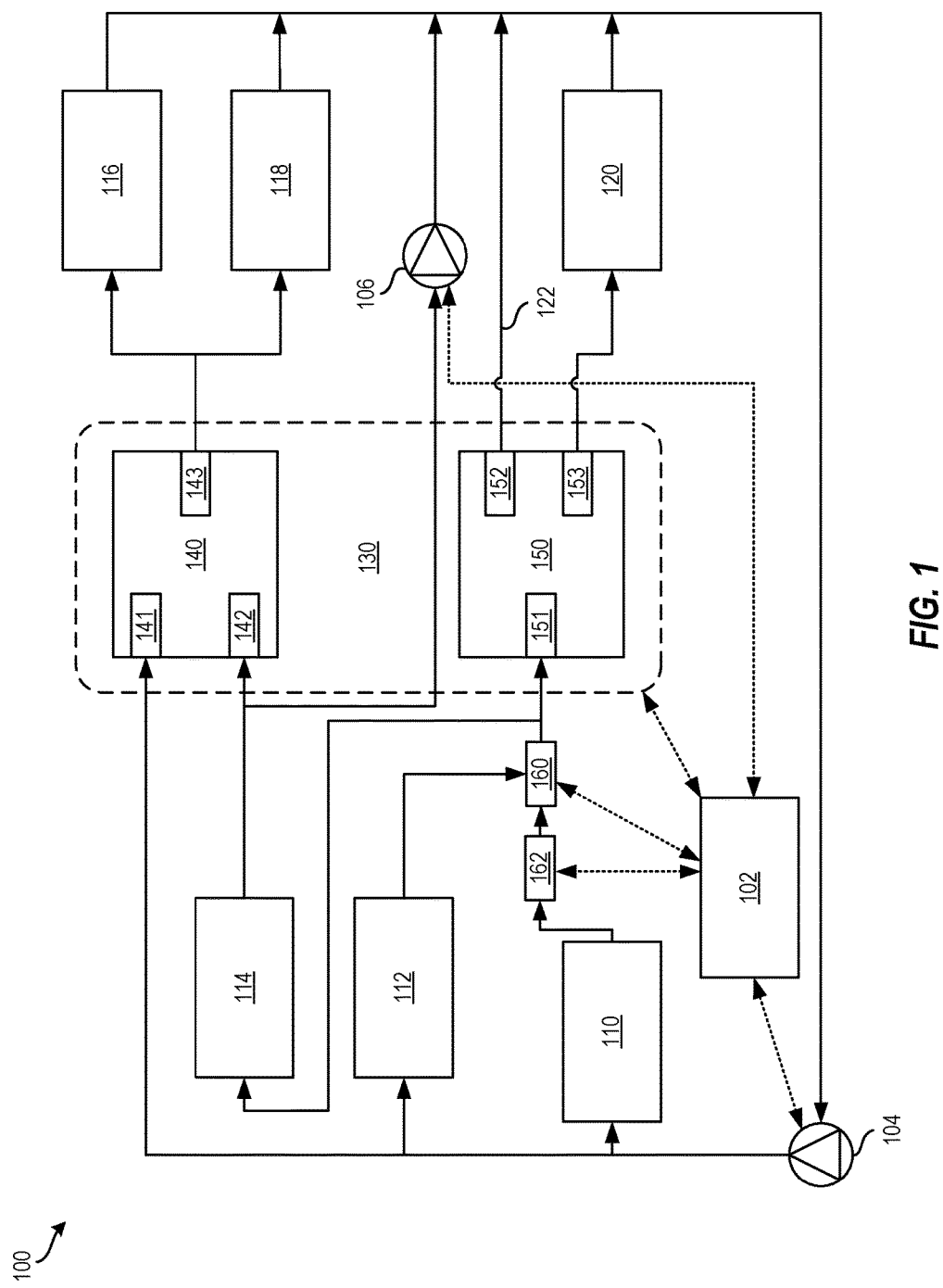
FIG. 1 depicts an example of a thermal layout for a vehicle engine, the vehicle engine including an actuator controller for controlling a cooling system for the vehicle engine using feedback linearization, according to embodiments of the present disclosure.

The following description is merely exemplary in nature and is not intended to limit the present disclosure, its application or uses. It should be understood that throughout the drawings, corresponding reference numerals indicate like or corresponding parts and features. As used herein, the term module refers to processing circuitry that may include an application specific integrated circuit (ASIC), an electronic circuit, a processor (shared, dedicated, or group) and memory that executes one or more software or firmware programs, a combinational logic circuit, and/or other suitable components that provide the described functionality.

Existing cooling systems utilize a single input, single output (SISO) approach. This means that each flow request is calculated using only a single input, such as a temperature error. However, as cooling systems increase in complexity, such as in active thermal management, SISO control approaches may not be appropriate. This means that existing SISO approaches are not sufficient to manage the higher level of complexity and are not sufficient to guarantee required performance. The reason is both the higher number of actuators and the high level of interactions within different zones within the cooling systems.

To address this problem, the technical solutions described herein provide for controlling a cooling system for the vehicle engine using feedback linearization. More particularly, the present techniques provide for the use of a non-linear multivariable (multi-input, multi-output (MIMO)) control approach based on physical dynamic models.

The present techniques can provide multiple benefits, including a reduction of calibration effort, optimization of actuator usage, systematic and robust control design, simplification of control design for MIMO nonlinear systems, and strong correlation between controls behavior and system physics. Accordingly, these techniques can improve the efficiency of the cooling system while reducing thermal stress on the engine, thereby preventing possible damage to, or failure of, the engine and its components. By controlling the flow of the coolant fluid, it is possible to operate the engine at the highest temperature possible without compromising the hardware integrity of the engine. This increases engine and fuel efficiency while preventing failure of the engine.

FIG. 1 depicts a thermal layout for a vehicle engine 100, the vehicle engine includes an actuator controller 102 for controlling a cooling system for the vehicle engine 100 using feedback linearization, according to embodiments of the present disclosure. According to one embodiment of the present disclosure, the vehicle engine 100 includes at least an actuator controller 102, a primary coolant pump ("pump") 104, an engine block 110, an engine head 112, other engine components 114 (e.g., a turbocharger, an exhaust gas re-circulator, etc.), a main rotary valve (MRV) 130, an engine oil heater 116, a transmission oil heater 118, a radiator 120, a flow control valve (FCV) 160, and a block rotary valve (BRV) 162. According to another embodiment of the present disclosure, the vehicle engine includes the MRV 130 and an electrical pump. In yet another embodiment of the present disclosure, the vehicle engine 100 includes the MRV 130 and the FCV 160. The transmission oil heater 118 may only be needed in the case of an automatic transmission and may not be included in the vehicle engine 100 in some embodiments. The BRV 162 may only be needed in cases with split cooling and may not be included in the vehicle engine 100 in some embodiments.

According to one or more embodiments of the present disclosure, the MRV 130 includes a first valve (or chamber) 140 having a first inlet 141, a second inlet 142, and an outlet 143. The MRV 130 also includes a second valve (or chamber) 150 having an inlet 151, a first outlet 152, and a second outlet 153. The various components of the vehicle engine 100 are connected and arranged as shown in FIG. 1 according to embodiments of the present disclosure, and the solid lines among the components represent the fluid connections among the components, with arrows representing the flow direction of the fluid. According to other embodiments, the MRV 130 can be configured differently than shown.

According to examples of the present disclosure, the primary pump 104 is a mechanical pump driven by the engine, such as through a fan belt, a serpentine belt, or a timing belt. Secondary pump 106 is an electric pump that includes an electric motor driven by a power source such as a battery (not shown) within the vehicle.

When the engine is running (on), coolant fluid is cooled by the radiator 120 and is pumped out of the radiator 120 by the primary pump 104 back into the engine block 110, the engine head 112, and the other components 114 (collectively, the "inlet" of the engine). When the engine is not running (off), the primary pump 104 does not pump coolant fluid through the cooling system. However, because the secondary pump 106 is an electric pump, it can pump coolant fluid through the cooling system even when the engine is not running. The actuator controller 102 can control the secondary pump 106 to cause the secondary pump 106 to change flow rates of the coolant fluid. The actuator controller 102 can also enable and disable at least the secondary pump 106.

Coolant fluid cooled by the radiator 120 can also be pumped directly into the first inlet 141 of the MRV 130. Managing the flow out of the radiator 120 enables mixing cold coolant with hot coolant in order to provide the coolant to the vehicle engine 100 at a desired temperature.

The actuator controller 102 controls the flow of coolant fluid through the vehicle engine 100 by opening and closing the first valve 140 and the second valve 150. Although not shown, each valve within the vehicle engine 100 can have one or more actuators associated therewith. The actuator controller 102 can send commands to the one or more actuators to manipulate (e.g., open, close, partially open, partially close) the valve associated therewith. In particular, the actuator controller 102 can cause the second valve 150 to direct flow from the engine block 110 and the engine head 112 into the radiator 120 and/or the radiator bypass 122 through the first outlet 152 and the second outlet 153. Similarly, the actuator controller 102 can cause the first valve 140 to direct flow from either the first inlet 141 and/or the second inlet 142 into the engine oil heater 116 and the transmission oil heater 118 through the outlet 143.

The first inlet 141 (also referred to as the "cold inlet") receives cooled coolant fluid via the primary pump 104 from the radiator 120. The second inlet 142 (also referred to as the "warm inlet") receives warm coolant fluid (warm relative to the cooled coolant fluid) after it is pumped by the primary pump 104 through the engine block 110/engine head 112 and the other components 114. The warm coolant fluid is warmed as it passes through the engine block 110, the engine head 112, and/or the other components. Accordingly, depending on the state of the first valve 140, the first valve 140 can provide either cooled coolant fluid or warm coolant fluid to the engine oil heater 116 and the engine transmission oil heater 118.

To reduce an influx of cool coolant fluid in the engine block 110 and the engine head 112, a flow control valve (FCV) 160 can be closed between the engine block 110/engine head 112 and the second valve 150 of the MRV 130. In particular, an inlet of the FCV 160 is in fluid communication (directly and/or indirectly) with an outlet of the engine block 110 and an outlet of the engine head 112, and an outlet of the FCV 160 is in fluid communication with the inlet 151 of the second valve 150 of the MRV 130 and an inlet of the other components 114.

When the FCV 160 is closed, the flow of coolant fluid into the radiator 120 is stopped so the coolant fluid is not cooled by the radiator 120. This prevents cooled coolant fluid from cycling back into the engine block 110/engine head 112. The actuator controller 102 controls the FCV 160 to open and shut the FCV 160 based at least in part on state changes of the MRV 130. According to some embodiments, the FCV 160 is partially closed (e.g., closed 25%, closed 50%, closed 80%, etc.) to achieve a desired flow (e.g., to maintain a consistent temperature through the vehicle engine 100).

However, in some situations, the engine block 110 and the engine head 112 may need different coolant fluid flow rates. For example, the engine block 110 and the engine head 112 each require a minimum flow to avoid boiling the coolant fluid and to prevent high temperatures within each block, which may cause damage thereto. Accordingly, the BRV 162 is introduced between an outlet of the engine block 110 and an inlet of the FCV 160 so that the BRV 162 is in fluid communication with the engine block 110 and the FCV 160. The BRV 162 is controllable by the actuator controller 102 to provide the ability to flow coolant fluid through each of the engine block 110 and the engine head 112 at different rates.

The actuator controller 102 can continuously regulate the FCV 160 and the BRV 162 to adjust the flow of coolant fluid that the primary pump 104 and/or the secondary pump 106 can provide through the engine block 110 and the engine head 112. By reducing the flow of the primary pump 104 and/or the secondary pump 106, it is possible to reduce also the load on the crankshaft (not shown), to reduce engine friction, and to maximize combustion efficiency.

With continuing reference to FIG. 1, in embodiments of the present disclosure, the actuator controller 102 can be a combination of hardware and programming. The programming may be processor executable instructions stored on a tangible memory, and the hardware can include a processing device for executing those instructions. Thus a system memory can store program instructions that when executed by the processing device implement the functionality described herein. Other engines/modules/controllers may also be utilized to include other features and functionality described in other examples herein. Alternatively or additionally, the actuator controller 102 can be implemented as dedicated hardware, such as one or more integrated circuits, Application Specific Integrated Circuits (ASICs), Application Specific Special Processors (ASSPs), Field Programmable Gate Arrays (FPGAs), or any combination of the foregoing examples of dedicated hardware, for performing the techniques described herein.

Figure 2:
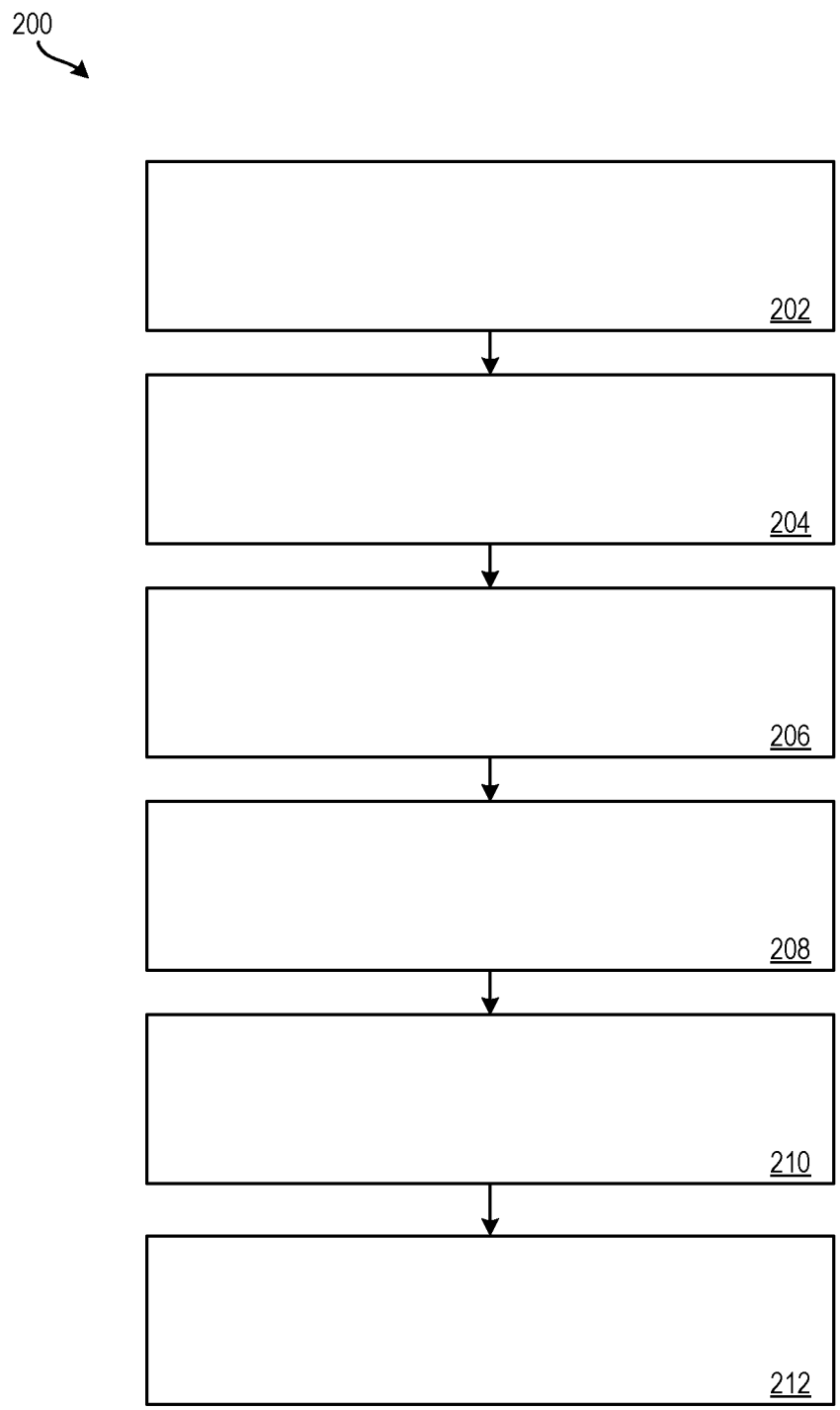
FIG. 2 depicts a flow diagram of a method for controlling a cooling system for the vehicle engine using feedback linearization, according to embodiments of the present disclosure.

FIG. 2 depicts a flow diagram of a method 200 for controlling a cooling system for the vehicle engine using feedback linearization, according to embodiments of the present disclosure. The method 200 may be implemented, for example, by the actuator controller 102 of FIG. 1, by the processing system 400 of FIG. 4, or by another suitable processing system or device.

A block 202, the actuator controller 102 (i.e., a processing device or processing system) receives desired temperature targets. The temperature targets can be for coolant fluid in a cooling system of the vehicle engine 100, for example; however, the temperature targets can also be for metal, oil, or something else.

At block 204, the actuator controller 102 receives temperature feedbacks. The temperature feedbacks are measured and/or estimated temperature values associated with the desired temperature targets.

At block 206, the actuator controller 102 calculates a desired temperature derivative for each of the desired temperature targets. Calculating the desired temperature derivative for each of the desired temperature targets is performed, for example, by a proportional-integral-derivative (PID) controller, which may be incorporated into the actuator controller 102, may be a separate device, or may be incorporated into another device. A PID controller is a control loop feedback mechanism that continuously calculates an error value as a difference between the desired temperature of the coolant fluid and a measured temperature of the coolant fluid and applies a correction based on proportional, integral, and/or derivative terms.

At block 208, the actuator controller 102 calculates desired coolant flows from the desired temperature derivative for each of the desired temperature targets using feedback linearization. Also referred to as an inverted thermal model, feedback linearization enables calculating desired coolant fluid flows based on desired temperature derivatives. A thermal model can be expressed by the following formula:

$$\dot{T} = A(T, T_{other}) + B(T, T_{other})\dot{m}$$

where $\dot{T}$ is a vector of the derivatives of the temperatures to be controlled in a closed loop, T is a vector of the temperatures to be controlled in the closed loop, $T_{other}$ is a vector containing all the temperatures that are not closed loop controlled (e.g., environmental temperatures), $A(T, T_{other})$ is a vector in which $a_i$ is a non-linear function of all temperatures within the cooling system (e.g., the natural response of the cooling system), $B(T, T_{other})$ is a square matrix in which $b_{ij}$ is a non-linear function of all temperatures within the cooling system (e.g., a forced response of the cooling system), and $\dot{m}$ is a vector containing zone flows of coolant fluids to zones within the cooling system (e.g., the engine block 110, the engine head 112, the other components 114, etc.).

Feedback linearization is accomplished by inverting the thermal model. The inverted thermal model for a desired temperature of coolant fluid can be expressed as follows, using the variables defined above:

$$\dot{m}_{DES} = B(T, T_{other})^{-1}(\dot{T}_{DES} - A(T, T_{other}))$$

where $\dot{T}_{DES}$ is a vector of the derivative of the desired temperature and $\dot{m}_{DES}$ is a vector containing the desired coolant flow for a zone based on the desired temperature.

At block 210, the actuator controller 102 calculates actuator commands from the desired coolant flows using an inverted hydraulic model. A hydraulic model is a mathematical model that describes the cooling system and can be used to analyze the behavior of the cooling system. By inverting the hydraulic model, an actuator command can be calculated based on the desired coolant flow. For example, an actuator command can be calculated as follows:

$$\text{ActCmd} = f^{-1}(\dot{m}_{DES})$$

wherein $f^{-1}$ represents the inverted hydraulic model and $\dot{m}_{DES}$ is a vector containing the desired coolant flow for a zone based on the desired temperature. This inversion takes into account also other flow requests calculated in open loop, the feedback temperature, the other temperatures ($T_{other}$) and other information that can force the actuator commands to do something specific.

At block 212, the actuator controller 102 implements the actuator commands in the cooling system. In other words, the actuator command is input into an actuator associated with a valve (e.g., the MRV 130, the FCV 160, the BRV 162, etc.) to manipulate the valve to cause the valve to provide the desired flow of coolant fluid. The actuator command can cause the valve to open or close an appropriate amount so that the desired flow is provided.

Additional processes also may be included, and it should be understood that the processes depicted in FIG. 2 represent illustrations and that other processes may be added or existing processes may be removed, modified, or rearranged without departing from the scope and spirit of the present disclosure.

Figure 3:
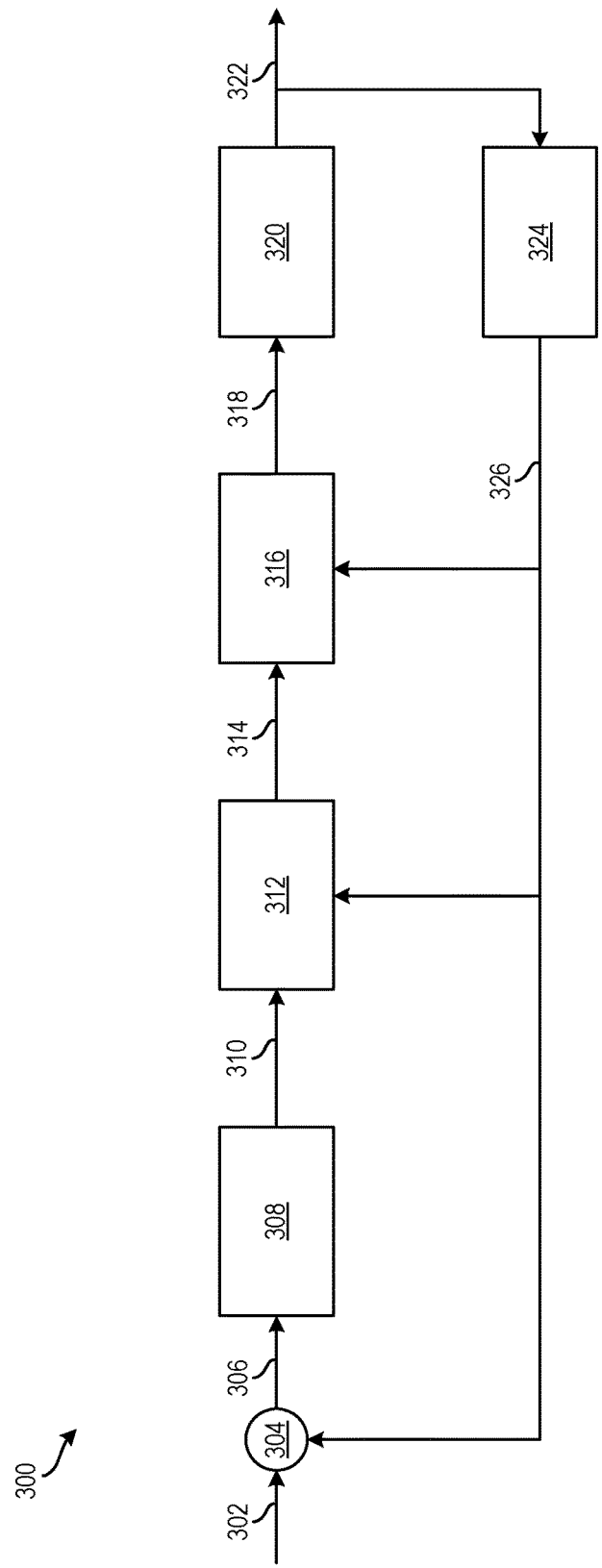
FIG. 3 depicts a flow diagram of a method for controlling a cooling system for the vehicle engine using feedback linearization, according to embodiments of the present disclosure.

FIG. 3 depicts a flow diagram of a method 300 for controlling a cooling system for the vehicle engine using feedback linearization, according to embodiments of the present disclosure. The method 300 may be implemented, for example, by the actuator controller 102 of FIG. 1, by the processing system 400 of FIG. 4, or by another suitable processing system or device.

A desired temperature ($T_{DES}$) 302 is received at a block 304 along with a feedback temperature ($T_{FB}$) 326. The block 304 calculates a vector of temperature errors (e.g., there is one error for each controlled temperature) using the corresponding desired temperatures 302 and feedback temperatures 326, and the temperature error vector 306 input into a PID controller 308. The PID controller 308 calculates a vector ($\dot{T}_{DES}$) 310 of the desired temperature derivatives. One of the differences between this MIMO approach and existing SISO approaches is that flow requests are calculated looking at all the PID outputs together, where existing SISO approaches each flow request was the output of one PID and no information from other flows/zones were considered.

Based on the vector 310, the feedback temperatures 326 and the other temperatures ($T_{other}$), a feedback linearization module 312 calculates the desired coolant flow vector ($\dot{m}_{DES}$) 314. The desired coolant flow vector 314 is converted into actuator commands (ActCmd) 318 by the inverted hydraulic model 316. This inversion takes into account also other flow requests calculated in open loop, the feedback temperature 326, the other temperatures ($T_{other}$) and other information that can force the actuator commands to do something specific. The actuator commands 318 are input into actuators 320 to provide the desired flow 322 of coolant fluid. The actuator commands can cause, for example, the valve to open or close by an appropriate amount so that the desired flow is provided. Actuators can be valves, electric pumps, and the like.

Once the actuator provides the desired flow 322, the desired flow of coolant fluid flows through the vehicle engine 100. A sensor 324 can be used to measure the actual temperature of the desired flow 322 to provide the feedback temperature 326, which is used by the block 304, the feedback linearization module 312, and/or the inverted hydraulic model 316 to adjust the calculations described herein to more accurately achieve the desired temperature 302. According to some embodiments of the present disclosure, the sensor 324 can be multiple sensors, a virtual sensor, or multiple virtual sensors. In some situations, it is not possible to place a sensor in a position in which it is desired to control the temperature; therefore, is necessary to estimate that temperature using a model and temperature information from other sensors using a virtual sensor.

Additional processes also may be included, and it should be understood that the processes depicted in FIG. 3 represent illustrations and that other processes may be added or existing processes may be removed, modified, or rearranged without departing from the scope and spirit of the present disclosure.

The present techniques presented herein make several assumptions. For example, the present techniques assume that the hydraulic dynamic is faster than the temperature dynamic, which is true. The present techniques also assume that the control model is ideal. Although this is not necessarily true, the PID controller 308 can compensate for this. Finally, the present techniques assume that all desired flows can be exactly realized. This is not true because it may be necessary to guarantee minimum flows in certain zones of the vehicle engine 100 and because a single valve for each controlled zone may not be available. To solve this problem, an anti-wind-up technique is implemented.

At an iteration k, it is possible to estimate $\dot{m}$ at step k−1 using a flow model in order to calculate the virtual inputs vector V at prior iteration k−1, which can be used for the anti-wind-up action using the following equations:

$$V_{k-1} = A(T)_{k-1} + B(T)_{k-1} \cdot \dot{m}_{DES,k-1}$$

$$\text{INT}_{k-1} = V_{k-1} - K_P(T_{DES,k-1} - T_{FB,k-1})$$

$$V_k = K_P(T_{DES,k} - T_{FB,k}) + K_I(T_{DES,k} - T_{FB,k}) + \text{INT}_{k-1}$$

where $V_k$ and $V_{k-1}$ are vectors containing the virtual inputs at iteration k and iteration k−1 respectively; $A(T)_{k-1}$, $B(T)_{k-1}$, are the model matrices calculated at previous iteration; $\dot{m}_{k-1}$ are the previous iteration k−1 zone flows estimated using the flow model; $T_{DES,k}$, $T_{DES,k-1}$ are vectors containing the desired temperatures at iteration k and iteration k−1 respectively; $T_{FB,k}$, $T_{FB,k-1}$ are vectors containing the feedback temperatures at iteration k and iteration k−1 respectively; $K_P$ and $K_I$ are the proportional and the integral gains (e.g., they should be two scalar values for each closed loop); and $\text{INT}_{k-1}$ is the integral part at iteration k calculated as $V_{k-1} - K_P(T_{DES,k-1} - T_{FB,k-1})$ to obtain the anti-wind-up action. This anti-wind-up action enables the compensation for guaranteeing minimum flows in certain zones and for the fact that a single valve for each zone is not necessarily available. Moreover, the anti-wind-up action compensates for the fact that not all the flow requests can be realized simultaneously.

The present MIMO techniques provide several benefits over existing SISO solutions. For example, the present techniques require minimal calibration effort, optimize actuator usage, guarantee required performances, provide for managing complex nonlinear systems, and strongly correlate controls behavior and system physics.

Figure 4:
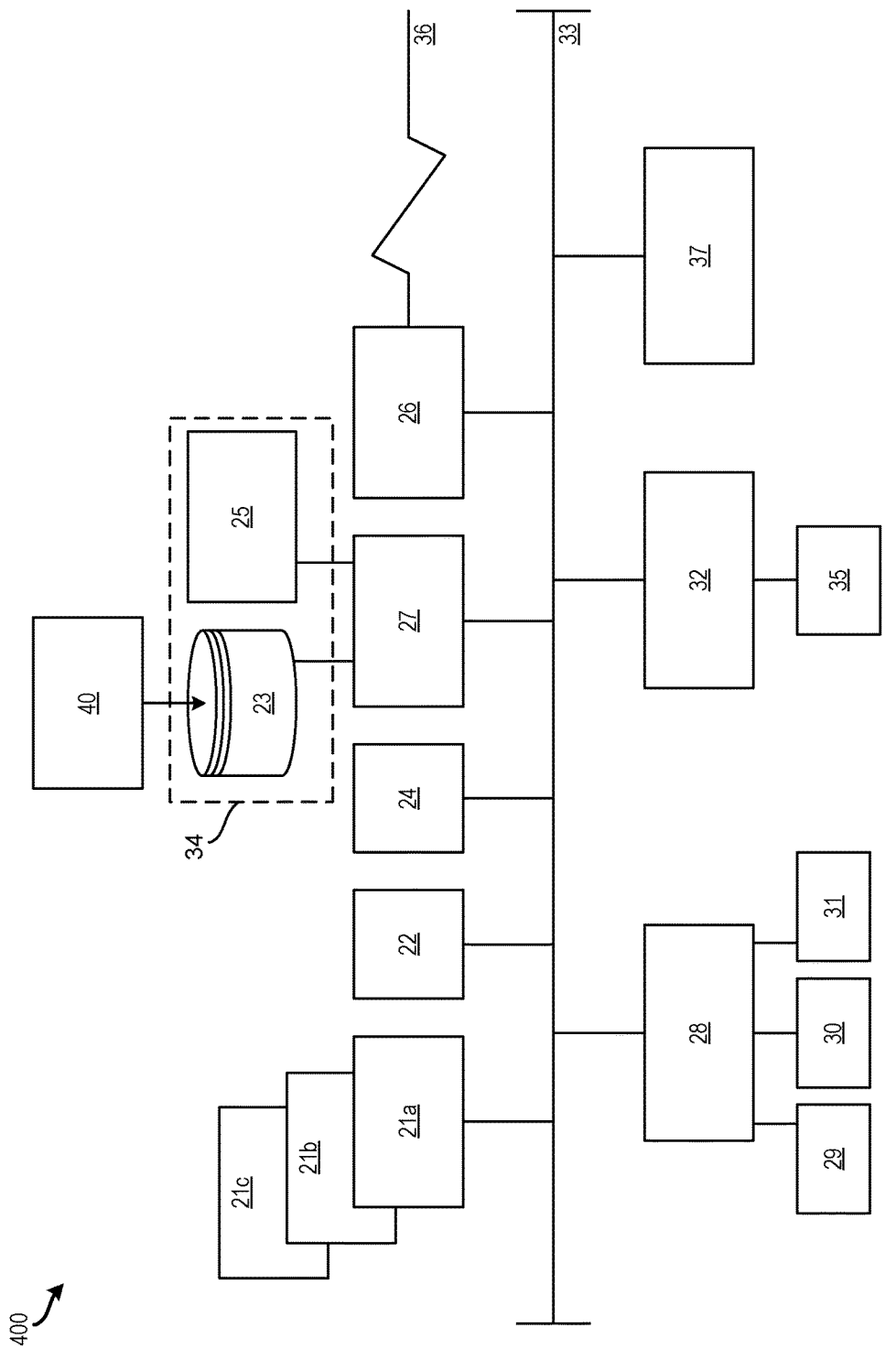
FIG. 4 depicts a block diagram of a processing system for implementing the techniques described herein, according to embodiments of the present disclosure.

It is understood that the present disclosure is capable of being implemented in conjunction with any other type of computing environment now known or later developed. For example, FIG. 4 illustrates a block diagram of a processing system 400 for implementing the techniques described herein. In examples, processing system 400 has one or more central processing units (processors) 21a, 21b, 21c, etc. (collectively or generically referred to as processor(s) 21 and/or as processing device(s)). In aspects of the present disclosure, each processor 21 may include a reduced instruction set computer (RISC) microprocessor. Processors 21 are coupled to system memory (e.g., random access memory (RAM) 24) and various other components via a system bus 33. Read only memory (ROM) 22 is coupled to system bus 33 and may include a basic inlet/outlet system (BIOS), which controls certain basic functions of processing system 400.

Further illustrated are an inlet/outlet (I/O) adapter 27 and a network adapter 26 coupled to system bus 33. I/O adapter 27 may be a small computer system interface (SCSI) adapter that communicates with a hard disk 23 and/or another storage drive 25 or any other similar component. I/O adapter 27, hard disk 23, and storage device 25 are collectively referred to herein as mass storage 34. Operating system 40 for execution on processing system 400 may be stored in mass storage 34. A network adapter 26 interconnects system bus 33 with an outside network 36 enabling processing system 400 to communicate with other such systems.

A display (e.g., a display monitor) 35 is connected to system bus 33 by display adapter 32, which may include a graphics adapter to improve the performance of graphics intensive applications and a video controller. In one aspect of the present disclosure, adapters 26, 27, and/or 32 may be connected to one or more I/O busses that are connected to system bus 33 via an intermediate bus bridge (not shown). Suitable I/O buses for connecting peripheral devices such as hard disk controllers, network adapters, and graphics adapters typically include common protocols, such as the Peripheral Component Interconnect (PCI). Additional inlet/outlet devices are shown as connected to system bus 33 via user interface adapter 28 and display adapter 32. A keyboard 29, mouse 30, and speaker 31 may be interconnected to system bus 33 via user interface adapter 28, which may include, for example, a Super I/O chip integrating multiple device adapters into a single integrated circuit.

In some aspects of the present disclosure, processing system 400 includes a graphics processing unit 37. Graphics processing unit 37 is a specialized electronic circuit designed to manipulate and alter memory to accelerate the creation of images in a frame buffer intended for outlet to a display. In general, graphics processing unit 37 is very efficient at manipulating computer graphics and image processing, and has a highly parallel structure that makes it more effective than general-purpose CPUs for algorithms where processing of large blocks of data is done in parallel.

Thus, as configured herein, processing system 400 includes processing capability in the form of processors 21, storage capability including system memory (e.g., RAM 24), and mass storage 34, inlet means such as keyboard 29 and mouse 30, and outlet capability including speaker 31 and display 35. In some aspects of the present disclosure, a portion of system memory (e.g., RAM 24) and mass storage 34 collectively store an operating system to coordinate the functions of the various components shown in processing system 400.

The descriptions of the various examples of the present disclosure have been presented for purposes of illustration, but are not intended to be exhaustive or limited to the embodiments disclosed. Many modifications and variations will be apparent to those of ordinary skill in the art without departing from the scope and spirit of the described techniques. The terminology used herein was chosen to best explain the principles of the present techniques, the practical application or technical improvement over technologies found in the marketplace, or to enable others of ordinary skill in the art to understand the techniques disclosed herein.

While the above disclosure has been described with reference to exemplary embodiments, it will be understood by those skilled in the art that various changes may be made and equivalents may be substituted for elements thereof without departing from its scope. In addition, many modifications may be made to adapt a particular situation or material to the teachings of the disclosure without departing from the essential scope thereof. Therefore, it is intended that the present techniques not be limited to the particular embodiments disclosed, but will include all embodiments falling within the scope of the application.

What is claimed is:

1. A computer-implemented method for controlling a cooling system for an internal combustion engine using feedback linearization, the method comprising:
    receiving, by a processing device, desired temperature targets;
    receiving, by the processing device, temperature feedbacks;
    calculating, by the processing device, a desired temperature derivative for each of the desired temperature targets;
    calculating, by the processing device, desired coolant flows from the desired temperature derivative for each of the desired temperature targets using feedback linearization;
    calculating, by the processing device, actuator commands from the desired coolant flows using an inverted hydraulic model; and
    implementing, by the processing device, the actuator commands in actuators in the cooling system.

2. The computer-implemented method of claim 1, further comprising measuring actual temperatures.

3. The computer-implemented method of claim 1, further comprising determining actual temperatures using virtual sensors.

4. The computer-implemented method of claim 2, further comprising inputting the actual temperatures into the feedback linearization and the inverted hydraulic model.

5. The computer-implemented method of claim 4, wherein calculating the desired coolant flows using the feedback linearization is based at least in part on the actual temperatures.

6. The computer-implemented method of claim 4, wherein calculating the actuator commands using the inverted hydraulic model is based at least in part on the actual temperatures.

7. The computer-implemented method of claim 6, wherein calculating the actuator commands using the inverted hydraulic model is based at least in part on flow requests.

8. The computer-implemented method of claim 6, wherein calculating the actuator commands using the inverted hydraulic model is based at least in part on information that can force the actuator commands to perform a specific task.

9. The computer-implemented method of claim 3, wherein calculating the desired temperature derivative for each of the desired temperature targets is based at least in part on the actual temperatures.

10. The computer-implemented method of claim 1, wherein calculating the desired temperature derivative for each of the desired temperature targets is performed using a proportional-integral-derivative controller.

11. The computer-implemented method of claim 1, further comprising applying an anti-wind-up action.

12. A system for controlling a cooling system for an internal combustion engine using feedback linearization, the system comprising:
a memory comprising computer readable instructions; and
a processing device for executing the computer readable instructions for performing a method, the method comprising:
receiving, by the processing device, desired temperature targets;
receiving, by the processing device, temperature feedbacks;
calculating, by the processing device, a desired temperature derivative for each of the desired temperature targets;
calculating, by the processing device, desired coolant flows from the desired temperature derivative for each of the desired temperature targets using feedback linearization;
calculating, by the processing device, actuator commands from the desired coolant flows using an inverted hydraulic model; and
implementing, by the processing device, the actuator commands in actuators in the cooling system.

13. The system of claim 12, the method further comprising measuring actual temperatures.

14. The system of claim 12, the method further comprising determining actual temperatures using virtual sensors.

15. The system of claim 13, the method further comprising inputting the actual temperatures into the feedback linearization and the inverted hydraulic model.

16. The system of claim 15, wherein calculating the desired coolant flows using the feedback linearization is based at least in part on the actual temperatures.

17. The system of claim 15, wherein calculating the actuator commands using the inverted hydraulic model is based at least in part on the actual temperatures.

18. The system of claim 17, wherein calculating the actuator commands using the inverted hydraulic model is based at least in part on flow requests.

19. The system of claim 17, wherein calculating the desired temperature derivative for each of the desired temperature targets is performed using a proportional-integral-derivative controller.

20. A computer program product for controlling a cooling system for an internal combustion engine using feedback linearization, the computer program product comprising:
a computer readable storage medium having program instructions embodied therewith, wherein the computer readable storage medium is not a transitory signal per se, the program instructions executable by a processing device to cause the processing device to perform a method comprising:
receiving, by the processing device, desired temperature targets;
receiving, by the processing device, temperature feedbacks;
calculating, by the processing device, a desired temperature derivative for each of the desired temperature targets;
calculating, by the processing device, desired coolant flows from the desired temperature derivative for each of the desired temperature targets using feedback linearization;
calculating, by the processing device, actuator commands from the desired coolant flows using an inverted hydraulic model; and
implementing, by the processing device, the actuator commands in actuators in the cooling system.

\* \* \* \* \*